(12) United States Patent
Rittinger (10) Patent No.: US 11,113,264 B2
(45) Date of Patent: Sep. 7, 2021

(54) CONFLICT RESOLUTION FOR DATABASE FILE MERGE

(71) Applicant: SAP SE, Walldorf (DE)

(72) Inventor: Jan Rittinger, Wiesloch (DE)

(73) Assignee: SAP SE, Walldorf (DE)

( * ) Notice: Subject to any disclaimer, the term of this patent is extended or adjusted under 35 U.S.C. 154(b) by 383 days.

(21) Appl. No.: 15/964,256

(22) Filed: Apr. 27, 2018

(65) Prior Publication Data
US 2019/0332699 A1    Oct. 31, 2019

(51) Int. Cl.
*G06F 16/23* (2019.01)
*G06F 16/25* (2019.01)
*G06F 7/14* (2006.01)

(52) U.S. Cl.
CPC .......... *G06F 16/2365* (2019.01); *G06F 7/14* (2013.01); *G06F 16/252* (2019.01)

(58) Field of Classification Search
CPC .......... G06F 8/71; G06F 8/65; G06F 16/2365; G06F 16/27; G06F 40/197; G06F 16/219; G06F 16/1873; G06F 7/14
See application file for complete search history.

(56) References Cited

U.S. PATENT DOCUMENTS

| | | | | |
|---|---|---|---|---|
| 7,290,251 B2 * | 10/2007 | Livshits | ............... | G06F 40/194 |
| | | | | 717/143 |
| 2006/0288053 A1 * | 12/2006 | Holt | ............... | G06F 16/273 |
| | | | | 707/999.203 |
| 2009/0006498 A1 * | 1/2009 | Freedman | ............ | G06F 16/256 |
| | | | | 707/999.203 |
| 2014/0164311 A1 * | 6/2014 | Junker | ............... | G06N 5/025 |
| | | | | 706/47 |
| 2015/0082292 A1 * | 3/2015 | Thomas | ............... | G06F 8/62 |
| | | | | 717/168 |
| 2018/0373434 A1 * | 12/2018 | Switzer | ............... | G06F 3/065 |
| | | | | 707/999.203 |

* cited by examiner

*Primary Examiner* — Yuk Ting Choi
(74) *Attorney, Agent, or Firm* — Buckley, Maschoff & Talwalkar LLC (57) ABSTRACT

Provided are systems and methods for resolving conflicts between different versions of a database file. In one example, the method may include one or more of receiving, at a database, a request to publish a modified version of a database file modified by a user having privileges to update the database file, detecting, during a merge operation, a conflict between one or more data values included in the unpublished modified version of the database file and one or more corresponding data values in an intervening version of the database file published by another user that also has privileges to update the database file, and outputting a user interface displaying an identification of the one or more conflicting data values and one or more selections for resolving the one or more conflicting data values.

21 Claims, 7 Drawing Sheets

FIG. 3A
(Layer 1)

310

|   | A | B | C | D |
|---|---|---|---|---|
| 1 | Time | All | | |
| 2 | Product | Public | Private | Suggested |
| 3 | All | 27 | 28 | 27 |
| 4 | +- P1 | 7 | 8 | 7 |
| 5 | +- P2 | 9 | 9 | 9 |
| 6 | +- P3 | 11 | 11 | 11 |

312    314    316

FIG. 3B
(Layer 2)

320

322    324

| E | F | G | H | I | J |
|---|---|---|---|---|---|
| +- 2014 | | | +- 2015 | | |
| Public | Private | Resolved | Public | Private | Resolved |
| 12 | 12 | 12 | 15 | 16 | 15 |
| 3 | 4 | 3 | 4 | 4 | 4 |
| 4 | 4 | 4 | 5 | 5 | 5 |
| 5 | 4 | 5 | 6 | 7 | 6 |

FIG. 4
(Suggested Layer)

| | A | B | C | D | E | F | G | H | I | J |
|---|---|---|---|---|---|---|---|---|---|---|
| 1 | Time | March | | | April | | | May | | |
| 2 | Product | Public | Private | Resolved | Public | Private | Resolved | Public | Private | Resolved |
| 3 | All | 10 | 12 | 12 | 9 | 9 | 9 | 15 | 16 | 16 |
| 4 | + P1 | 7 | 11 | 11 | 3 | 4 | 3 | 4 | 4 | 4 |
| 5 | + P2 | 9 | 14 | 9 | 4 | 4 | 4 | 5 | 5 | 5 |
| 6 | + P3 | 11 | 16 | 14.5 | 5 | 5 | 5 | 6 | 7 | 7 |

510
Receiving a Request to Publish a Modified Version of a Database File

520
Detecting a Conflict Between the Unpublished Modified Version and an Intervening Published Version during a Merge 530
Outputting a User Interface Identifying the Conflict and a Selection for Resolving the Conflict

FIG. 6

CONFLICT RESOLUTION FOR DATABASE FILE MERGE

BACKGROUND

Analytic software can provide answers to complicated questions based on just a few inputs. Analytic software often blends data from different sources, creates compelling data visualizations, runs ad hoc reporting, and the like. Analytic data can be captured from content stored in spreadsheets, on premise databases, cloud databases, files, tables, and the like. The analytic software may analyze the underlying data and provide user-friendly illustrations (charts, graphs, tables, etc.) which enhance an understanding of the data. Analytic software may be used throughout an organization and often by multiple users at the same time. Often, situations arise where multiple users are working on the same piece of data at the same time. In such a situation, conflicts occur when two users change the same data from a database file differently and then attempt to store the modified data to the database. In this situation, the last user to upload their data creates conflicting values at the database.

However, a database does not provide support for cohesively merging separately modified versions of a database table/file where a conflict occurs. Rather, the database typically locks a table or a set of rows from the table when that data is being worked on by a user thereby preventing any other users from modifying the data table. In other words, the database may lock out users from creating a conflict. As another example, when a lock is not performed and parallel updates occur, the parallel updates may cause the database to detect one of the two updates as failing. As another example, the database may enable data to be modified at any time by any user. Here, the last change (chronologically) in the database file is that change that wins and the database overwrites any previous changes committed prior. However, none of these mechanisms facilitate notification or resolution of a conflict. Instead, the database makes a decision based on a setting, and does not make the user aware that such a determination has been performed. Accordingly, what is needed is a tool for identifying and facilitating resolution of conflicts in a situation where multiple versions of a database file are present and without overwriting the earlier data.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The example embodiments are directed to a system which can facilitate detection and resolution of conflicts within database tables without overwriting or causing a failure in a database publishing process. For example, when two users are modifying a common database file at the same time, one user typically publishes their modified version of the database file before the other (also referred to as an intervening published database file). When the subsequent user attempts to publish their modified version of the database file, one or more conflicts within the data values of the database file may be detected. Furthermore, rather than overwrite the data from the intervening published database file, the system can notify the user of the conflict, and also provide the user with options for resolving the conflict such as choices and/or options of data values to select. In some embodiments, the database file may have layers of data which can be drilled into (drilled down) and collapsed (drilled-up). Therefore, the conflict notification generated by the system may also provide the user with the ability to drill down and drill up on the conflict data. Furthermore, the system may automatically start at an intermediate level of the conflict data based on where conflicts occur and what data is most likely to be of interest to the user.

Traditional analytic software can provide a user with a private version (copy of analytic data) for planning, development, analysis, etc. The copying process allows modification of the data, and the modified data can be stored (published) during write back to the public source version. However, traditional analytic software does not offer a conflict resolution mechanism when conflicts occur but instead merely overwrites any conflicting changes that were previously updated after the copy was downloaded. The example embodiments can detect when a private version of an unpublished data file has a conflict with a recently published version of the database file published by another user (i.e., another version). Furthermore, the system can notify the user of the private version of the conflict and also provide the user with both the value of the data in the current public version of the database file, the value of the data in the unpublished private version of the database file, and also a suggested value based on both the private and the public values. In doing so, the system can not only detect conflicts but it can also facilitate resolution of the conflicts based on user decisions/options.

Figure 1A:
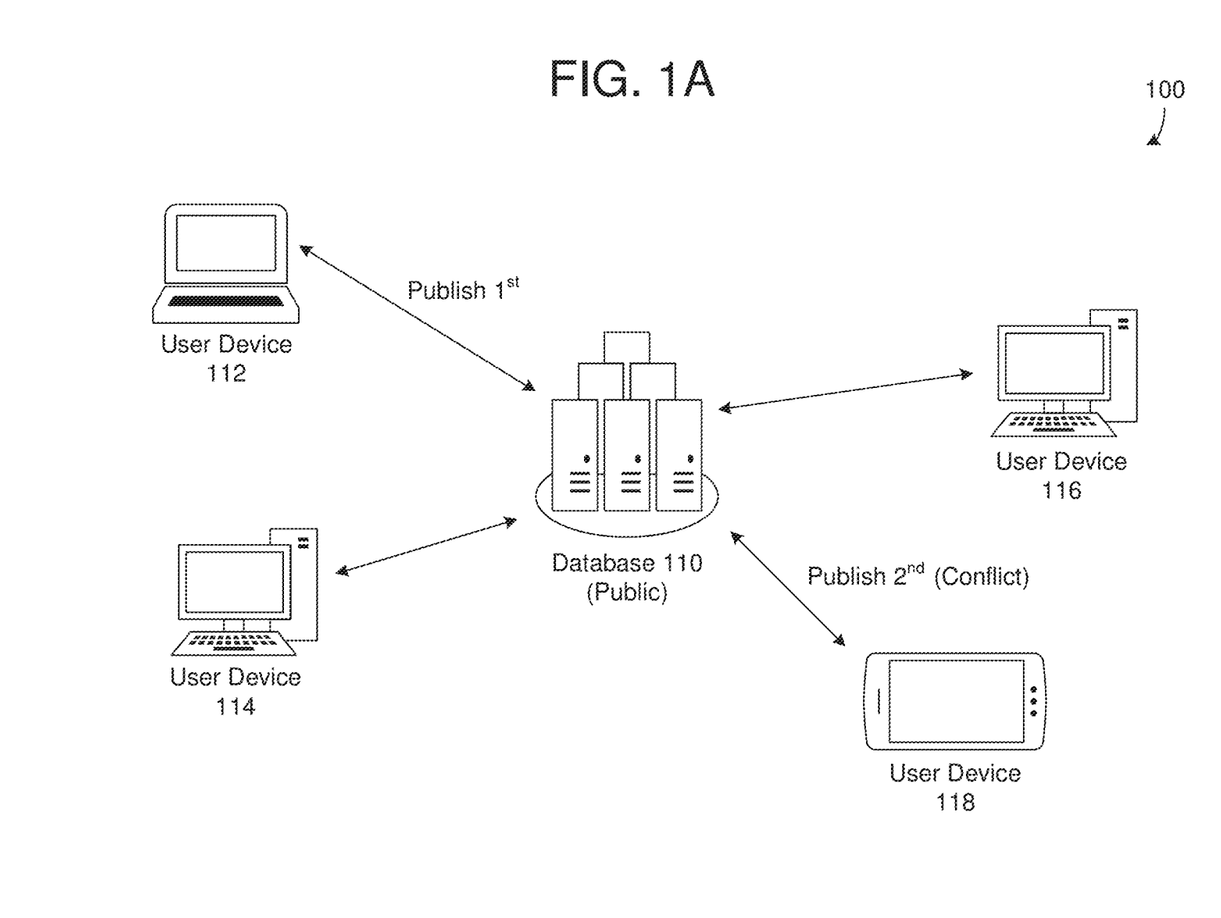
FIG. 1A is a diagram illustrating a database network in accordance with an example embodiment.

FIG. 1A illustrates a database network 100 in accordance with an example embodiment. Referring to the example of FIG. 1A, a plurality of user devices 112, 114, 116, and 118 share access to data from a database 110 within the database network 100. The user devices 112-118 and the database 110 may be connected via a network such as the Internet, a private network, and the like. According to various embodiments, database files that are published or otherwise stored at the database 100 may be referred to as public data that is visible to all of the users (i.e., user devices 112-118). Database files may include analytic data, for example, tabular data (rows, columns, etc.), spreadsheets, documents, and the like. Meanwhile, a copy of a public database file may be download or otherwise transferred from the database 110 to any of the user devices 112-118 where it may be modified locally. When stored locally on the user device, the database file may be referred to as a private version of the database file that is visible to only the local user. When a user desires to publish the modified version, the user may submit the modified version to the database 110.

According to various aspects, given the ability of any of the authorized users (user devices 112-118) to modify a common database file, it is possible that the same database file could be simultaneously modified by two different users. In this case, a first user 112 to submit their modified version of the database file may be committed by the database 110. However, when a second user 116 attempts to publish their modified version of the database file, the database 110 may identify one or more conflicts within the unpublished version of the database file and the intervening published database file. Furthermore, the database 110 may output a notification of the conflict(s) to a user interface or may display a notification of the conflict(s) via an already displayed user interface on the second user 116. Furthermore, the second user 116 may choose various selections for resolving the conflict(s) and the database 110 can store the modified database file (or values therein) accordingly.

Figure 1B:
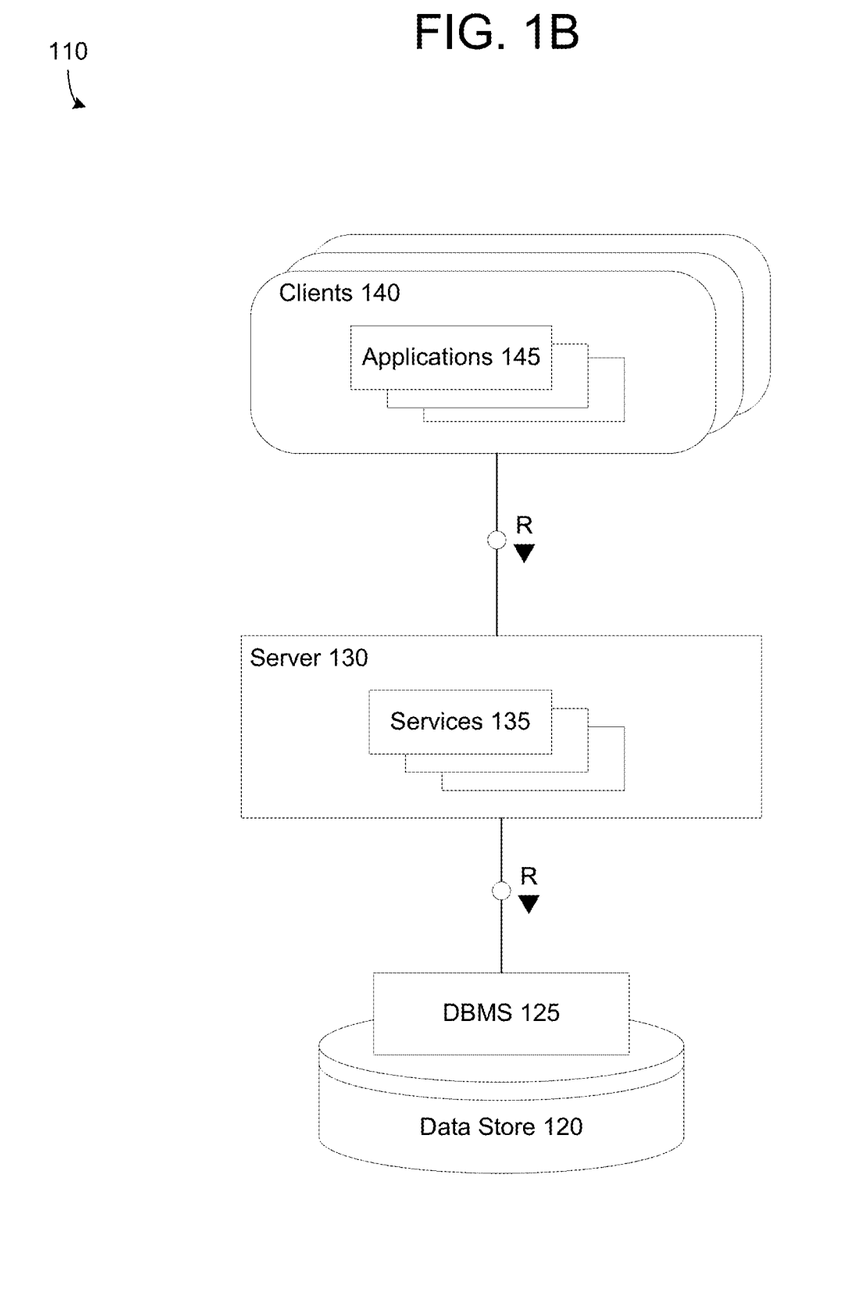
FIG. 1B is a diagram illustrating a database system architecture in accordance with an example embodiment.

FIG. 1B illustrates a system architecture of a database 110 in accordance with an example embodiment. It should be appreciated that the embodiments are not limited to architecture 110 or to a database architecture, however, FIG. 1B is shown for purposes of example. Referring to FIG. 1B, the architecture 110 includes a data store 120, a database management system (DBMS) 125, a server 130, services 135, clients 140 and applications 145. Generally, services 135 executing within server 130 receive requests from applications 145 executing on clients 140 and provides results to applications 145 based on data stored within data store 110. For example, server 130 may execute and provide services 135 to applications 145. Services 135 may comprise server-side executable program code (e.g., compiled code, scripts, etc.) which provide functionality to applications 145 by providing user interfaces to clients 140, receiving requests from applications 145 (e.g., drag-and-drop operations), retrieving data from data store 110 based on the requests, processing the data received from data store 110, and providing the processed data to applications 145.

In one non-limiting example, a client 140 may execute an application 145 to perform visual analysis of analytical data causing analytic data to be output to a user interface on a display of the client 140 which allows the user to view analytical information such as charts, graphs, tables, and the like, based on the analytic data. The application 145 may pass analytic information based on the input to one of services 135. An SQL script may be generated based on the request and forwarded to DBMS 125. DBMS 125 may execute the SQL script to return a result set based on data of data store 120, and the application 145 creates a report/visualization based on the result set. As another example, the analytic data may be input by the user and provided directly from the application 145 to the DBMS 125 or the data store 120. According to various embodiments, an application 145 may include the logical components to perform the data merge and conflict resolution steps/processes described herein.

The services 135 executing on server 130 may communicate with DBMS 120 using database management interfaces such as, but not limited to, Open Database Connectivity (ODBC) and Java Database Connectivity (JDBC) interfaces. These types of services 135 may use Structured Query Language (SQL) to manage and query data stored in data store 120. The DBMS 125 serves requests to query, retrieve, create, modify (update), and/or delete data from database files stored in data store 120, and also performs administrative and management functions. Such functions may include snapshot and backup management, indexing, optimization, garbage collection, and/or any other database functions that are or become known.

Server 130 may be separated from or closely integrated with DBMS 125. A closely-integrated server 130 may enable execution of services 135 completely on the database platform, without the need for an additional server. For example, server 130 may provide a comprehensive set of embedded services which provide end-to-end support for Web-based applications. The services 135 may include a lightweight web server, configurable support for Open Data Protocol, server-side JavaScript execution and access to SQL and SQLScript. Server 130 may provide application services (e.g., via functional libraries) using services 135 that manage and query the database files stored in the data store 120. The application services can be used to expose the database data model, with its tables, views and database procedures, to clients 140. In addition to exposing the data model, server 130 may host system services such as a search service.

Data store 120 may comprise any query-responsive data source or sources that are or become known, including but not limited to a structured-query language (SQL) relational database management system. Data store 120 may include a relational database, a multi-dimensional database, an Extensible Markup Language (XML) document, or any other data storage system storing structured and/or unstructured data. The data of data store 120 may be distributed among several relational databases, dimensional databases, and/or other data sources. Embodiments are not limited to any number or types of data sources. In some embodiments, the data of data store 120 may include files having one or more of conventional tabular data, row-based data, column-based data, object-based data, and the like. Moreover, the data may be indexed and/or selectively replicated in an index to allow fast searching and retrieval thereof. Data store 120 may support multi-tenancy to separately support multiple unrelated clients by providing multiple logical database systems which are programmatically isolated from one another. Furthermore, data store 120 may support multiple users that are associated with the same client and that share access to common database files stored in the data store 120.

The architecture 110 may include metadata defining objects which are mapped to logical entities of data store 120. The metadata may be stored in data store 120 and/or a separate repository (not shown). The metadata may include information regarding dimension names (e.g., country, year, product, etc.), dimension hierarchies (e.g., country, state, city, etc.), measure names (e.g., profit, units, sales, etc.) and any other suitable metadata. According to some embodiments, the metadata includes information associating users, queries, query patterns and visualizations. The information may be collected during operation of system and may be used to determine a visualization to present in response to a received query, and based on the query and the user from whom the query was received.

Each of clients 140 may include one or more devices executing program code of an application 145 for presenting user interfaces to allow interaction with application server 130. The user interfaces of applications 145 may comprise user interfaces suited for reporting, data analysis, and/or any other functions based on the data of data store 120. Presentation of a user interface as described herein may include any degree or type of rendering, depending on the type of user interface code generated by server 130. For example, a client 140 may execute a Web Browser to request and receive a Web page (e.g., in HTML format) from application server 130 via HTTP, HTTPS, and/or Web Socket, and may render and present the Web page according to known protocols. One or more of clients 140 may also or alternatively present user interfaces by executing a standalone executable file (e.g., an .exe file) or code (e.g., a JAVA applet) within a virtual machine. Clients 140 may execute applications 145 which perform merge operations of underlying data files stored in data store 120. Furthermore, clients 140 may execute the conflict resolution methods and processes described herein to resolve data conflicts between different versions of a data file stored in the data store 120.

Figure 2:
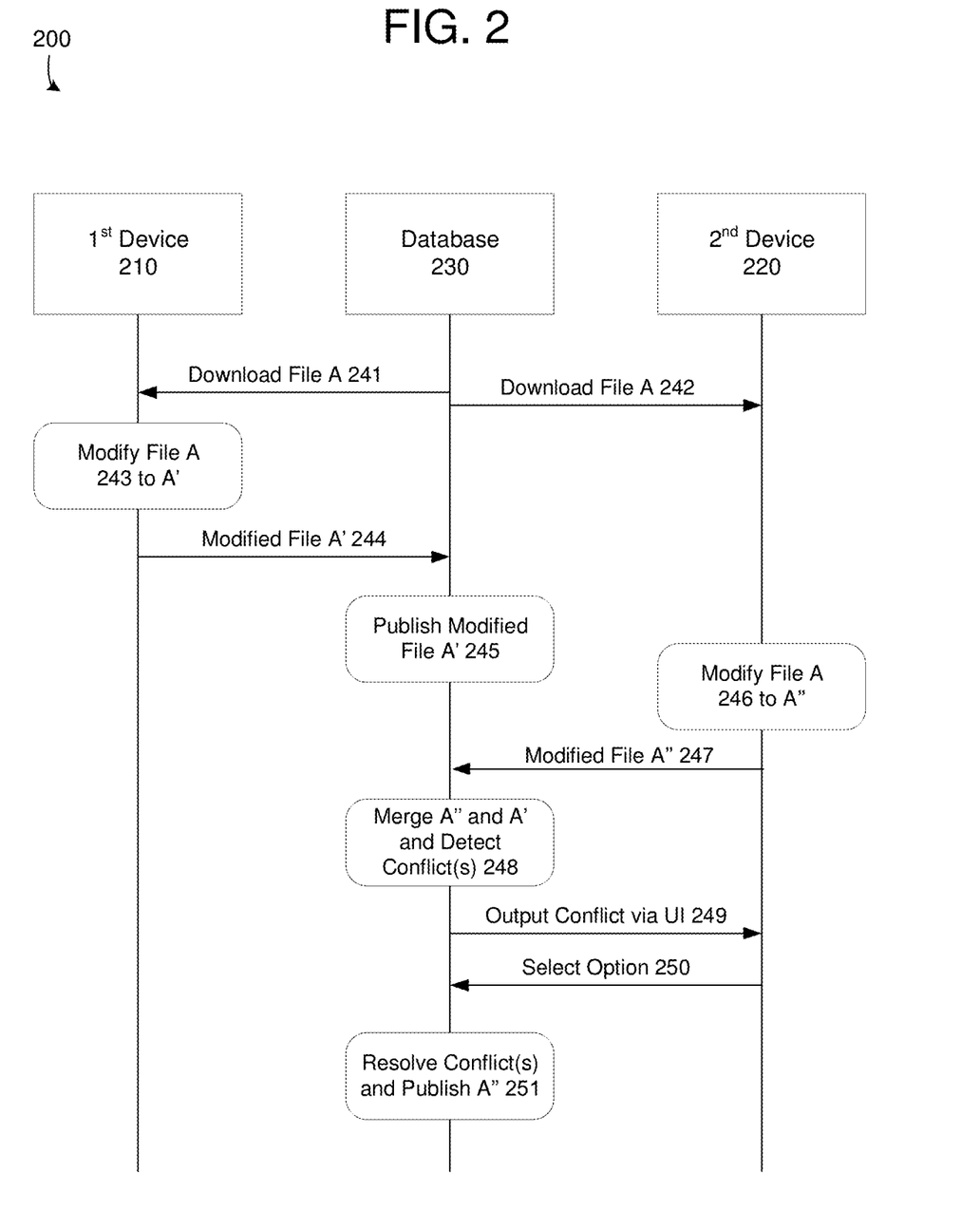
FIG. 2 is a diagram illustrating a process of detecting and resolving a conflict in accordance with an example embodiment.

FIG. 2 illustrates a process 200 of detecting and resolving a conflict between versions of a database file in accordance with an example embodiment. In this example, a first user device 210 and a second user device 220 each have authorization to access and modify a common database file (File A) that is stored and published at database 230. In 241, the first user device 210 receives a copy of the most recent published version of the database file A. Likewise, in 242, the second user device 220 receives the same copy of the most recent published version of the database file A. While the same database file is downloaded by each of the first user device 210 and the second user device 220 in this example, it is not necessary that both the first user device 210 and the second user device 220 receive the same copy of the database but may instead receive different versions of the database file A which are published at different points in time. In 243, the first user device 210 modifies the received copy of the database file A to generate a modified version of the file (i.e., database file A').

In 244 the first user device 210 transmits the modified database file A' to the database 230, and in 245, the database 230 publishes the modified database file A' in place of the original database file A. The publishing in 245 may include merging values within the database file A' with values in the most recently published database file A. The merge may result in any changed values within A' being used to overwrite any conflicting values in the original database file A, as is performed in a standard database However, in this example, the second user device 220 still has a previous copy of the database file A and not the modified version of the database file A'. In 246, the second user device 220 generates a modified version of database file A which generates a second modified database file A". In this case, the modified database file A' is an intervening published database file with respect to the second modified database file A" generated by the second user device 220 because the second modified database file A" does not include the changes implemented by the published database file A'. In 247, the second user device 220 transmits the unpublished modified database file A" to the database 230 along with a request to publish the modified database file A". In some embodiments, the second user device 220 may transmit information about the split state of A in 247. For example, the second user device may send both the before and after database files (i.e., A and A") which will identify the changes made to the database file A by the second user device 220 when creating database file A". As another example, the second user device 220 may transmit information about the original state of database file A such as an identifier, memory address, etc., to the database 230 if the database still remember the original state of A to enable the database 230 to identify the changes.

In 248, the database 230 attempts to merge the unpublished modified database file A" received from the second user device 220 with the previously modified and published database file A' received from the first user device 210. However, in this example, the database 230 detects that the modified database file A" from the second user device 220 has one or more values therein that conflict with one or more corresponding values in the previously published database file A' received from the first user device 210 and which the second user device 220 is not aware of. The reason for the conflict may be that the value may be changed in one of the modified versions of the database file A' or A", but not changed in the other, or it may be changed in both versions of the database file A' and A". Accordingly, in 249, the database 230 will transmit a notification to the second user device 220 (e.g., via a user interface) indicating that there is an intervening published database file A', and identifying any conflicting values between the published intervening database file A' and the unpublished modified database file A" that the second user device 220 desires to publish.

In addition, in 249, the database 230 may also output one or more options which can be selected via the user interface for resolving the conflicts. For example, for each conflicting value between the two database files A' and A", the database 230 may provide selections for choosing the value included in the database file A', the value included in the database file A", an intermediate value, a suggested value, and/or the like. In 250, the second user device 220 selects choice(s) for each conflicting value and, in 251, the database 230 merges the previously published modified database file A' with the unpublished modified database file A" based on the user selections for resolving the conflict(s), and publishes the database file A" with conflicts resolved.

Analytic data may be stored in database tables (files) that have no given order. Comparing rows in these tables and finding differences may be possible through an analytic model where the columns are distinguished into dimensions and measures. As one non-limiting example, all dimension values of a row in a database file may be used to form a key and the measure values may be used to form the corresponding values of the row so that the member combinations of the dimension values can be used to compare two different data sets such as table data from the unpublished modified database file A" and the published intervening database file A'.

There are different types of merge operations that may be performed by the database such as database 230 when performing the check for conflicts. Examples of merge operations include a three-way merge which takes into account a common base data set (e.g., from a previous point in time) and merges two changed data sets such as published intervening database file A' and unpublished modified database file A". As another example, the merge operation may include a two-way merge operation which considers the differences in values between two different data sets of the same database table/file. Either of these merge operations can detect conflicts (i.e., different values in both data sets) and, in some cases, can resolve conflicts automatically (e.g., if the base data set values match only one of the two values).

According to various aspects, a two-way merge can compare arbitrary states of a database file that don't necessarily need to be from a common origin. In many cases, the two-way merge creates a large number of conflicts when reporting any differences between the two files as a conflict. Meanwhile, a three-way merge requires a common state (original) on which both database files are based. Here, conflicts may only be detected when both modified versions change the database file differently (e.g., change a same value of the database file differently).

In addition to analytic data, the database files may include files and/or data such as documents, spreadsheets, XML documents, and the like. In some embodiments, if there is a hierarchical or nested representation of the file content and/or data (e.g., pages, chapters, worksheets, columns, rows, subtrees, etc.) and a function to aggregate to a higher hierarchy or nested level then the described merge-tool may also allow a merge resolution on a coarse-grained and a fine-grained level. In some cases, due to the multi-dimensional nature the mechanism may be more powerful for analytic data (as there may be more details that can be looked at with different points of views (e.g., changes in 2014 vs. changes in Europe, etc.)

As one example, the two-way merge takes both data sets which in the examples herein are referred to as a private data set (visible to a local user) and a public data set (visual to all users) and merges the private data set into the public one using the SQL constructs union, aggregate and group by. Below is an example of code used for a two-way merge for a given data set structure with dimensions D1, . . . , Dn and a single measure M1 and includes following SQL query:

The query detects the member combinations with conflicts. These conflicts can be used to perform an automatic coarse merge resolution: unused if private data set wins while writing into public data set and used as negative filter for resolution public data set wins to filter out all changes in the private data set while writing into public data set. Alternatively, the conflicts can be used to steer the merge tool for the fine-grained merge resolution. As an example, the query may be adjusted to cope with delta values, NULL values, and zero values during auto-merge. Multiple measures affect the query based on the decision whether a complete set of measures (e.g., a complete row) is replaced or each measure value is resolved independently.

The three-way merge assumes that both public and private data set stem from an original data set against which both data sets can be compared. This allows to resolve changes on member combinations automatically if only private or public differs from original. For a given data set structure with dimensions D1, Dn and a single measure M1 a similar query as the following SQL query may be generated:

```
select D1, ..., Dn, "private", "public"
  from (select D1, ..., Dn,
        SUM("original.M1") as "original", SUM("private.M1") as "private",
        SUM("public.M1") as "public", SUM("isOriginal") as "isOriginal",
        SUM("isPrivate") as "isPrivate", SUM("isPublic") as "isPublic"
    from (select D1, ...., Dn,
        SUM("M1") as "original.M1", NULL as "private.M1",
NULL as "public.M1",
        1 as "isOriginal", 0 as "isPrivate", 0 as "isPublic"
      from "original.dataset"
      group by D1, ..., Dn
    union
    select D1, ...., Dn,
        NULL as "original.M1", SUM("M1") as "private.M1",
NULL as "public.M1",
        0 as "isOriginal", 1 as "isPrivate", 0 as "isPublic"
      from "privat.dataset"
      group by D1, ..., Dn
    union
    select D1, ...., Dn,
        NULL as "original.M1", NULL as "private.M1", SUM
("M1") as
"public.M1",
        0 as "isOriginal", 0 as "isPrivate", 1 as "isPublic"
      from "public.dataset"
      group by D1, ..., Dn)
  group by D1, ..., Dn)
```

```
select D1, ..., Dn, "private", "public"
  from (select D1, ..., Dn,
        SUM("private.M1") as "private", SUM("public.M1") as "public",
        SUM("isPrivate") as "isPrivate", SUM("isPublic") as "isPublic"
    from (select D1, ...., Dn, SUM("M1") as "private.M1", NULL as "public.M1",
        1 as "isPrivate", 0 as "isPublic"
      from "private.dataset"
      group by D1, ..., Dn
    union
    select D1, ...., Dn, NULL as "private.M1", SUM("M1") as "public.M1",
        0 as "isPrivate", 1 as "isPublic"
      from "public.dataset"
      group by D1, ..., Dn)
    group by D1, ..., Dn)
  where "isPrivate" > 0 and "isPublic" > 0 and "private" <> "public"
```

-continued

```
where "isPrivate" > 0 and "original" <> "private"
and "isPublic" > 0 and "original" <> "public"
and "private" <> "public";
```

As SQL's comparison with the value NULL is always false as all three inequality comparisons need to correctly handle these cases. For example, ("private"< >"public") may be rewritten as ("private"< >"public" or ("private" is null and "public" is not null) or ("private" is not null and "public" is null)). Furthermore, similar to the two-way merge, special handling may be performed for delta, NULL, and zero values as well as multiple measures.

The merge tool can be an extended version of an analytics data grid, where dimensions can be added or removed to both X and Y axes. Furthermore, the dimensions might be filtered so that only a part of the data set is visible. These navigation features allow the user to selectively reach any measure value in either an aggregated or detailed representation. The grid can indicate the cells that have a conflict in their sub region.

As one example, if each member context consists of three cells with private, public, and resolved values, then a click/select (or a similar interaction) on either the private or public cell can replace, for the whole sub region, the values for resolved version. Each resolution removes all affected member combinations from the list of unresolved conflicts. An additional counter may show the number of unresolved conflicts. Based on this counter additional drill states can be automatically proposed by the system to find a drill state with a large number of unresolved conflicts. Based on all unresolved conflicts the merge tool may calculate the cardinality for each dimension and sort them into three different groups:

Cardinality=dimension cardinality
Cardinality=1-3
Cardinality=others

All dimensions with a small cardinality of conflicts is moved to the filter. All dimensions with a cardinality less than the original dimension cardinality are sorted descending on their cardinality and the two highest ones are placed on X and Y axis. On both dimensions (if applicable) a hierarchy filter is applied to the respective lowest common ancestor of the conflicts.

Figure 3A:
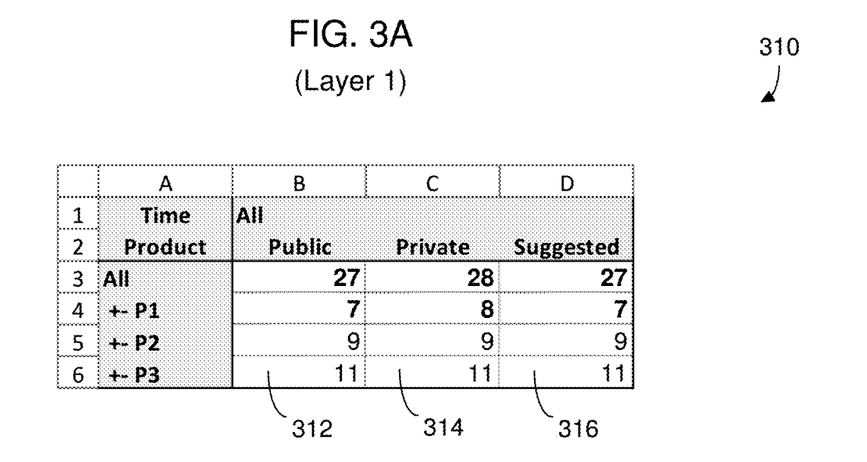
FIGS. 3A and 3B are diagrams illustrating a user interface displaying layers of data conflicts in accordance with an example embodiment.
Figure 3B:
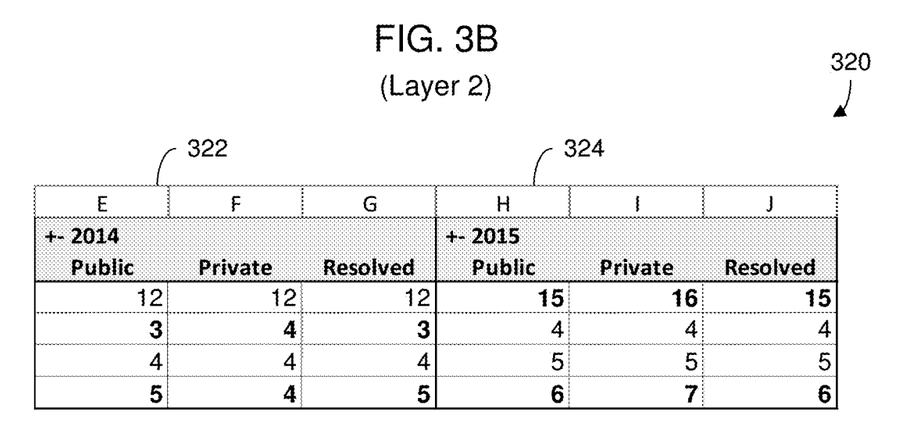

The visual merge tool described herein may support conflict resolution similar to a merge tool for a text file but for underlying database files. The visual merge tool may use analytic properties of the data and show data in an aggregated fashion allowing the user to resolve merge conflicts on a coarse level (e.g. allow one of the datasets to win, or data set 1 to win for part of the data and data set 2 to win for the rest of the data, etc. Furthermore, as shown in the examples of FIGS. 3A-3B, the visual merge tool also enables a user to drill down into cells that have a conflict shown in their aggregated data region and resolve the conflicts on a detailed level. As another example, the visual merge tool enables a user to drill-up (or otherwise broaden) the data view which can be helpful when there are many conflicts related to a conflict at a higher level in the hierarchical data. The merge tool can also be automated in such a way that it proposes drill states with conflicts (e.g., in FIG. 4) so that the user doesn't have to search for a limited number of conflicts in a large data set.

Figure 4:
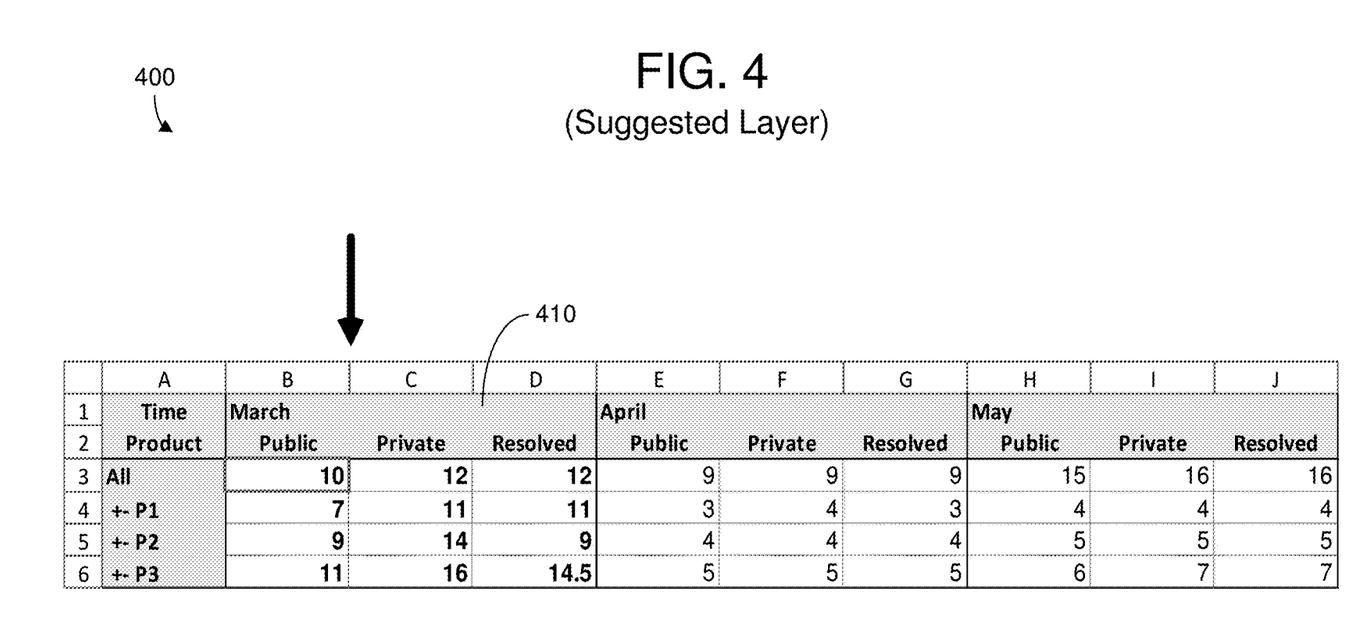
FIG. 4 is a diagram illustrating a user interface displaying a suggested layer of conflict data in accordance with an example embodiment.

FIGS. 3A and 3B illustrate user interfaces 310 and 320 outputting a display of different layers of conflicting data between two database files, in accordance with an example embodiment. Meanwhile, FIG. 4 illustrates a user interface 400 outputting a display of a suggested layer of conflicting data, in accordance with an example embodiment. The user interfaces 310, 320, and 400 may be generated and output by a database or a computing system associated with the database, but embodiments are not limited thereto. Furthermore, the user interfaces may be displayed on a display embedded or connected to the database, or it may be output over a network to a different device operating on the database data.

Referring to FIG. 3A, a first layer of conflict data is shown via the user interface 310. In this example, public data values 312 are shown and may correspond to a published intervening database table that is described herein. User interface 310 also displays private data values 314 which may correspond to a local unpublished version of a database table. In this example, the user interface 310 also includes suggested data values 316 which may be an automated selection that is suggested to the user by the database that is outputting the user interface 310. For example, the suggested data values 316 may include one of the private or published data values, an average of the different data values, or the like. Each of the public data values 312, private data values 314, and suggested data values 316, may include selectable options such as buttons, links, icons, etc., which can be selected by a user via the user interface 310 and which can trigger the database to resolve a conflict based on the selected value.

Meanwhile, FIG. 3B illustrates a second layer of conflict data values which are shown via the user interface 320. Here, the second layer may be displayed by drilling down on the first layer of conflicting data shown in FIG. 3A. For example, the user interface may include a tab, a zoom key, a button, etc. (not shown in these examples) which can be used to drill down and/or drill up on the conflict data values to reveal underlying sub-values, or conceal and collapse sub-values and only show parent values. In this example, the first layer of data is actually composed of two sub-layers of data values 322 and 324 which are combined to determine the first layer values. Each layer may provide differing conflict information. For example, the upper (first) layer may identify that there is a different in the data in P1, while the lower layer (second) may identify a specific year where the data is different. The ability to drill-down can enable a user to figure out exactly where the conflict exists. On the other hand, if the user is looking at a great deal of conflicts (e.g., dozens, hundreds, thousands, etc.) the user may want to drill-up to identify where such conflicts generally are located before making any further drill-down decisions.

In addition, FIG. 4 illustrates a user interface 400 which provides a suggested layer 410 by drilling down into one or more intermediate layers of conflict data. For example, the database may determine a layer 410 within conflicting data values that may be of more interest to a user based on the conflicts within each layer, including type of conflicts, amount of conflicts, discrepancy of conflicts, and the like. In this example, the layer 410 is a layer for a particular month (i.e., March) rather than a year, a day, a week, etc. The automated process may identify the layer and automatically display the layer when the user interface pops up on the screen, as one non-limiting example.

Figure 5:
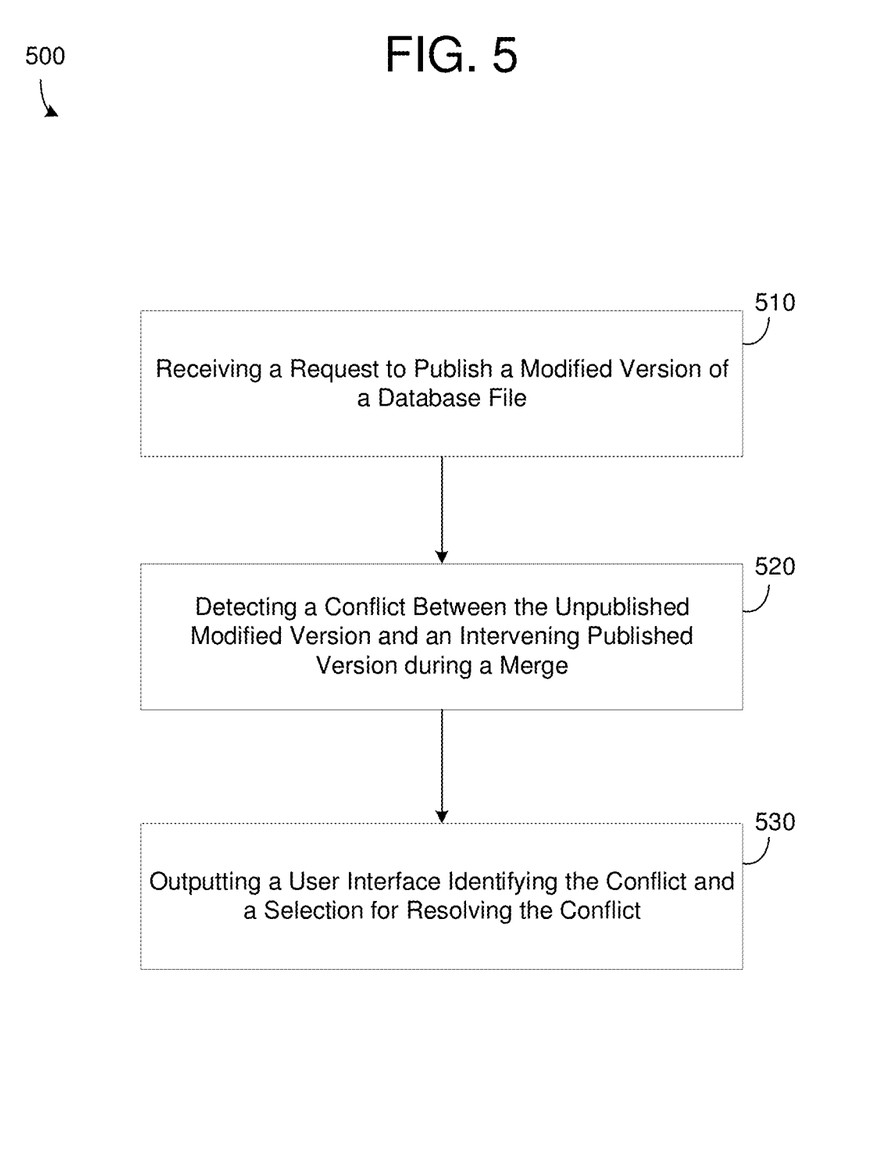
FIG. 5 is a diagram illustrating a method for resolving conflicts with an intervening database file in accordance with an example embodiment.

FIG. 5 illustrates a method 500 for resolving conflicts with an intervening database file in accordance with an example embodiment. As an example, the method 500 may be performed by a database node included within a distributed database system. As another example, the method 500 may be performed by a computing device such as a server, a cloud platform, a user device, an on-premises server, and the like. In some examples, the method 500 may be performed by a plurality of devices in combination. Referring to FIG. 5, in 510, the method may include receiving, at a database, a request to publish a modified version of a database file modified by a user having privileges to update the database file. The database file may include tabular (rows and/or columns) data such as a spreadsheet, a JSON file, a word processor document, a record, and the like. The request may be received from a user from an organization or other entity that includes a group of users authorized to access, read, modify, delete, add, etc., data to the database file.

In 520, the method may include detecting a conflict between one or more data values included in the unpublished modified version of the database file and one or more corresponding data values in an intervening version of the database file published at the database by another user that also has privileges to update the database file. For example, the intervening published version of the database file may be published after the database file is downloaded by the user but before the user attempts to publish the modified version of the database file. In other words, the intervening published version of the database file may be a version that was not published when the database file was downloaded for modification by the user but has since been uploaded or otherwise published by another user. In some embodiments, the intervening published version of the database file may be a private file published by another user through the database making it a public file visible to all authorized users while the unpublished modified version of the database file may include a private file that is visible to only the user and that is not visible to other authorized of the published database file.

The conflict may include differing cell values between one or more cells of the unpublished modified versions of the database file value and the published intervening version of the database file. For example, the differing values may include different numerical values, different answers, missing or absent values, and the like. The conflict may be detected during a merge operation when the database attempts to merge the unpublished modified version of the database file visible to only the user with a public version of the database file that is visible and accessible to all users. During the merge, the database may identify any values that are not equal and identify those values as conflicts.

In some embodiments, the method may further include attempting a two-way merge between the unpublished modified version of the database file and the previous version of the database file published by another user, and the detecting may include detecting the conflict during the attempted two-way merge. As another example, the method may further include attempting a three-way merge between the unpublished modified version of the database file, the previous version of the database file published by another user, and a copy of the database file at a previous point in time before the previous version of the database file was published, and the detecting comprises detecting the conflict during the attempted three-way merge.

In 530, the method may include outputting a user interface displaying an identification of one or more conflicting data values and one or more selections for automatically resolving the one or more conflicting data values at the database. For example, the user interface may include a numerical value or other value which identifies the previous intervening published version of a value, the proposed unpublished version of the value, and a suggested value determined by the system. In this example, respective options for selecting any of these values may be provided individually for each conflicting value. In some embodiments, a granularity of the data values displayed on the user interface may be collapsed (drilled-up) and expanded (drilled-down). For example, the user interface may display an option for adjusting the granularity to be more coarse (i.e., collapsed) or to be more fine (i.e., expanded). As an example, in response to receiving a request to drill-down into the conflict data, the user interface may reveal one or more underlying sub-values of each conflicting value between the prior published version and the unpublished modified version.

Figure 6:
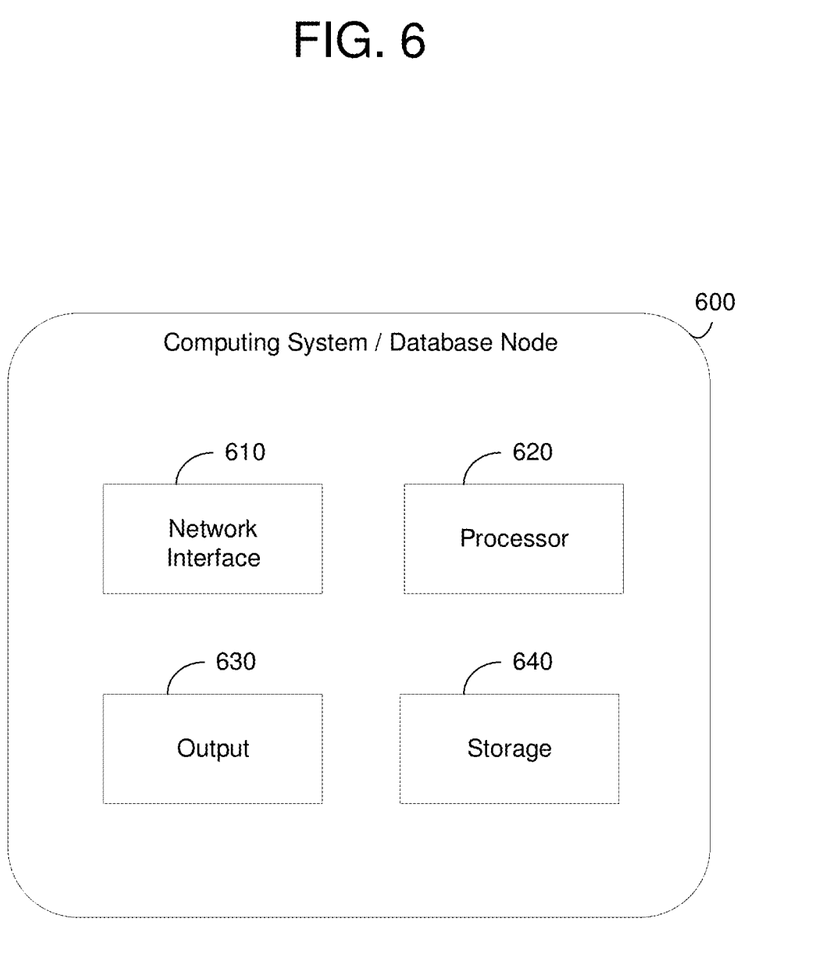
FIG. 6 is a diagram illustrating a computing system in accordance with an example embodiment.

FIG. 6 illustrates a computing system 600, in accordance with an example embodiment. For example, the computing system 600 may be a database node, a server, a cloud platform, a user device, or the like. In some embodiments, the computing system 600 may be distributed across multiple devices. Referring to FIG. 6, the computing system 600 includes a network interface 610, a processor 620, an output 630, and a storage device 640 such as an in-memory. Although not shown in FIG. 6, the computing system 600 may also include or be electronically connected to other components such as a display, an input unit, a receiver, a transmitter, a persistent disk, and the like. The processor 620 may control the other components of the computing system 600.

The network interface 610 may transmit and receive data over a network such as the Internet, a private network, a public network, an enterprise network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The output 630 may output data to an embedded display of the computing system 1000, an externally connected display, a display connected to the cloud, another device, and the like. For example, the output 630 may include a port, an interface, a cable, a wire, a board, and/or the like, with input/output capabilities. The network interface 610, the output 630, or a combination thereof, may interact with applications executing on other devices. The storage device 640 is not limited to a particular storage device and may include any known memory device such as RAM, ROM, hard disk, and the like, and may or may not be included within the cloud environment. The storage 640 may store software modules or other instructions which can be executed by the processor 620 to perform the method 500 shown in FIG. 5.

According to various embodiments, the processor 620 may receive a request to publish a modified version of a database file (and a copy of the database file) modified by a user having privileges to update the database file. In response, the processor 620 may determine whether a conflict exists between the unpublished database file and any intervening files that have been published. Here, the processor 620 may detect a conflict between one or more data values included in the unpublished modified version of the database file and one or more corresponding data values in an intervening version of the database file published at the database by another user that also has privileges to update the database file.

Furthermore, the output 630 may output a user interface to a display device (e.g., embedded, externally connect, on display screen of another device, etc.) displaying an identification of the one or more conflicting data values and one or more selections for automatically resolving the one or more conflicting data values at the database. In some embodiments, the output 630 may display options for selecting a prior published intervening version of a conflicting data value, an unpublished modified version of a conflicting data value, a suggested value, and the like, for each conflicting value between the intervening published version and the unpublished modified version of the database file. In some embodiments, a granularity of data values including the published intervening data values, the unpublished modified data values, and the like, may be output via the user interface and may be used to reveal one or more underlying sub-values of each conflicting value between the prior published version and the unpublished modified version, or hide displayed data values by drilling up.

In some embodiments, the intervening published version of the database file may be a file that is published by the processor after the database file is downloaded by the user who is attempting to publish the modified version of the database file. In some embodiment, the intervening published version of the database file may include a public file visible to all authorized users while the unpublished modified version of the database file may include a private file that is visible to only the user.

In some embodiments, the processor 620 may detect a conflict between values within cells of a table included in the unpublished modified version of the database file and the intervening published version of the database file. In some embodiments, the processor 620 may attempt a two-way merge between the unpublished modified version of the database file and the previous version of the database file published by another user, and detect the one or more conflicting data values during the attempted two-way merge. As another example, the processor 620 may attempt a three-way merge between the unpublished modified version of the database file, the previous version of the database file published by another user, and a copy of the database file at a previous point in time before the previous version of the database file was published, and detect the one or more conflicting data values during the attempted three-way merge.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
   a processor configured to
      receive a request to publish a modified version of a database file modified by a user having privileges to update the database file,
      detect a conflict between one or more data values of hierarchical data included in a table of the unpublished modified version of the database file and one or more corresponding data values of corresponding hierarchical data in an intervening version of the database file published at the database by another user that also has privileges to update the database file,
      determine a suggested aggregation layer of the one or more conflicting data values within different aggregation layers of the hierarchical data included in the table based on an amount of conflicts within suggested aggregation layer, wherein a column of conflicting data values in the suggested aggregation layer of the table encompasses an aggregate of all conflicting data values from among a plurality of columns of conflicting data values within a next lowest aggregation layer of the table, and
      output a user interface displaying an identification of the one or more conflicting data values in the suggested aggregation layer and one or more selections for automatically resolving the one or more conflicting data values at the database.

2. The computing system of claim 1, wherein the intervening published version of the database file is published by the processor after the database file is downloaded by the user and before the user attempts to publish the modified version of the database file.

3. The computing system of claim 1, wherein the intervening published version of the database file comprises a public file visible to all authorized users, and the unpublished modified version of the database file comprises a private file that is visible to only the user.

4. The computing system of claim 1, wherein the processor is configured to detect a conflict between values within cells of a table included in the unpublished modified version of the database file and the intervening published version of the database file.

5. The computing of claim 1, wherein the processor is configured to attempt a two-way merge between the unpublished modified version of the database file and the previous version of the database file published by another user, and detect the one or more conflicting data values during the attempted two-way merge.

6. The method of claim 1, wherein the processor is configured to perform a three-way merge in which each of the previous version of the database file published by another user and the modified unpublished version of the file are independently compared to a copy of the database file at a previous point in time before the previous version of the database file was published, to detect any conflicting data values.

7. The computing system of claim 1, wherein the output user interface comprises options for selecting a prior version, an unpublished modified version, and a suggested version, for each conflicting value between the intervening published version and the unpublished modified version of the database file.

8. The computing system of claim 1, wherein a granularity of data values within the prior published version and the unpublished modified version output via the user interface are configured to be modified to reveal one or more underlying sub-values of each conflicting value between the prior published version and the unpublished modified version.

9. A method comprising:
  receiving, at a database, a request to publish a modified version of a database file modified by a user having privileges to update the database file;
  detecting a conflict between one or more data values of hierarchical data included in a table of the unpublished modified version of the database file and one or more corresponding data values of corresponding hierarchical data in an intervening version of the database file published at the database by another user that also has privileges to update the database file;
  determining a suggested aggregation layer of the one or more conflicting data values within different aggregation layers of the hierarchical data included in the table based on an amount of conflicts within suggested aggregation layer, wherein a column of conflicting data values in the suggested aggregation layer of the table encompasses an aggregate of all conflicting data values from among a plurality of columns of conflicting data values within a next lowest aggregation layer of the table; and
  outputting a user interface displaying an identification of the one or more conflicting data values in the suggested aggregation layer and one or more selections for automatically resolving the one or more conflicting data values at the database.

10. The method of claim 9, wherein the intervening published version of the database file is published after the database file is downloaded by the user and before the user attempts to publish the modified version of the database file.

11. The method of claim 9, wherein the intervening published version of the database file comprises a public file visible to all authorized users, and the unpublished modified version of the database file comprises a private file that is visible to only the user.

12. The method of claim 9, wherein the detecting comprises detecting a conflict between values within cells of a table included in the unpublished modified version of the database file and the intervening published version of the database file.

13. The method of claim 9, wherein the method further comprises attempting a two-way merge between the unpublished modified version of the database file and the previous version of the database file published by another user, and the detecting comprises detecting the conflict during the attempted two-way merge.

14. The method of claim 9, wherein the method further comprises performing a three-way merge in which each of the previous version of the database file published by another user and the modified unpublished version of the file are independently compared to a copy of the database file at a previous point in time before the previous version of the database file was published, to detect any conflicting values.

15. The method of claim 9, wherein the user interface comprises options for selecting a prior version, an unpublished modified version, and a suggested version, for each conflicting value between the intervening published version and the unpublished modified version of the database file.

16. The method of claim 9, wherein a granularity of data values within the prior published version and the unpublished modified version output via the user interface are configured to be modified to reveal one or more underlying sub-values of each conflicting value between the prior published version and the unpublished modified version.

17. A non-transitory computer-readable storage medium storing program instructions that when executed cause a processor to perform a method comprising:
  receiving, at a database, a request to publish a modified version of a database file modified by a user having privileges to update the database file;
  detecting a conflict between one or more data values of hierarchical data included in a table of the unpublished modified version of the database file and one or more corresponding data values of corresponding hierarchical data in an intervening version of the database file published at the database by another user that also has privileges to update the database file;
  determining a suggested aggregation layer of the one or more conflicting data values within different aggregation layers of the hierarchical data included in the table based on an amount of conflicts within suggested aggregation layer, wherein a column of conflicting data values in the suggested aggregation layer of the table encompasses an aggregate of all conflicting data values from among a plurality of columns of conflicting data values within a next lowest aggregation layer of the table; and
  outputting a user interface displaying an identification of the one or more conflicting data values in the suggested aggregation layer and one or more selections for resolving the one or more conflicting data values.

18. The non-transitory computer readable medium of claim 17, wherein the intervening published version of the database file is published after the database file is downloaded by the user and before the user attempts to publish the modified version of the database file.

19. The non-transitory computer readable medium of claim 17, wherein the intervening published version of the database file comprises a public file visible to all authorized users, and the unpublished modified version of the database file comprises a private file that is visible to only the user.

20. The non-transitory computer readable medium of claim 17, wherein the detecting comprises detecting a conflict between values within cells of a table included in both the unpublished modified version of the database file and the intervening published version of the database file.

21. The computing system of claim 1, wherein the processor is further configured to output a selection for drilling-up into a parent column of conflicting data values in a parent aggregation layer of the table with respect to the suggested aggregation layer, wherein the parent column of conflicting data values encompasses an aggregate of all conflicting data values from among a plurality of columns of conflicting data values within the suggested aggregation layer of the table.

* * * * *